(12) United States Patent
Mayo et al.

(10) Patent No.: US 10,732,881 B1
(45) Date of Patent: Aug. 4, 2020

(54) REGION CLONING FOR DEDUPLICATION

(71) Applicants: Richard Phillip Mayo, Bristol (GB); David Malcolm Falkinder, Bristol (GB)

(72) Inventors: Richard Phillip Mayo, Bristol (GB); David Malcolm Falkinder, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 7 days.

(21) Appl. No.: 16/262,578

(22) Filed: Jan. 30, 2019

(51) Int. Cl.
*G06F 3/06* (2006.01)

(52) U.S. Cl.
CPC ............ *G06F 3/0641* (2013.01); *G06F 3/065* (2013.01); *G06F 3/0608* (2013.01); *G06F 3/0644* (2013.01); *G06F 3/0671* (2013.01)

(58) Field of Classification Search
CPC .... G06F 3/0641; G06F 3/0608; G06F 3/0644; G06F 3/065; G06F 3/061; G06F 3/064; G06F 3/0638; G06F 3/067; G06F 3/0671; G06F 3/0673; G06F 3/0683
See application file for complete search history.

(56) References Cited

U.S. PATENT DOCUMENTS

| | | | |
|---|---|---|---|
| 8,566,519 B2 | 10/2013 | Lay et al. | |
| 9,542,397 B1* | 1/2017 | Graham | G06F 3/0619 |
| 2010/0268902 A1* | 10/2010 | Drobychev | G06F 16/13 |
| | | | 711/156 |
| 2012/0084523 A1* | 4/2012 | Littlefield | G06F 11/1469 |
| | | | 711/162 |
| 2013/0024435 A1* | 1/2013 | Poirier | G06F 16/1756 |
| | | | 707/695 |
| 2013/0067175 A1* | 3/2013 | Yadav | G06F 3/0617 |
| | | | 711/154 |
| 2016/0004598 A1 | 1/2016 | Lillibridge et al. | |
| 2016/0170657 A1 | 6/2016 | Suehr et al. | |
| 2016/0210064 A1* | 7/2016 | Dornemann | G06F 11/1448 |

(Continued)

OTHER PUBLICATIONS

Fu, M. et al., "Accelerating Restore and Garbage Collection in Deduplication-based Backup Systems via Exploiting Historical Information," Jun. 18-20, 2014, USENIX ATC '14, pp. 181-192. https://www.usenix.org/system/files/conference/atc14/atc14-paper-fu_min.pdf.

(Continued)

*Primary Examiner* — Michael Krofcheck
(74) *Attorney, Agent, or Firm* — Hewlett Packard Enterprise Patent Department (57) ABSTRACT

In some examples, region cloning may include obtaining a clone request to clone a logical range of a source backup. The clone request may specify the source backup, a logical start offset, and a logical end offset. A source manifest associated with the logical range of the source backup may be determined. A start entry of the source manifest may be identified based on the logical start offset. The start entry may represent a start data chunk. A determination may be made as to whether the logical start offset represents an intermediate position of the start data chunk, and if so, a start partial chunk entry representing a sub-range of the start data chunk may be appended to a destination manifest. A backup of the logical range of the source backup may be generated based on the destination manifest with the appended start partial chunk entry.

15 Claims, 5 Drawing Sheets

(56) References Cited

U.S. PATENT DOCUMENTS

2017/0242615 A1\* 8/2017 Mayo .................... G06F 3/0608
2019/0188124 A1\* 6/2019 Ferrante .............. G06F 12/0246

OTHER PUBLICATIONS

Lillibridge, M. et al., "Improving Restore Speed for Backup Systems That Use Inline Chunk-based Deduplication," Feb. 12, 2013, pp. 183-197. https://pdfs.semanticscholar.org/3d5b/06d3956514efc0f0f4052a26cb320e4df2df.pdf.
Lillibridge, M. et al., "Sparse indexing: Large Scale, Inline Deduplicatfon using Sampling and Locality," Jan. 14, 2009, 27 pages. https://www.usenix.org/legacy/event/fast09/tech/full_papers/lillibridge/lillibridge_html/index.html.

\* cited by examiner

OBTAIN A CLONE REQUEST TO CLONE A LOGICAL RANGE OF A SOURCE BACKUP
402

DETERMINE A SOURCE MANIFEST ASSOCIATED WITH THE LOGICAL RANGE OF THE SOURCE BACKUP
404

IDENTIFY, BASED ON THE LOGICAL START OFFSET, A START ENTRY OF THE SOURCE MANIFEST, THE START ENTRY REPRESENTING A START DATA CHUNK
406

IDENTIFY, BASED ON THE LOGICAL END OFFSET, AN END ENTRY OF THE SOURCE MANIFEST, THE END ENTRY REPRESENTING AN END DATA CHUNK
408

DETERMINE WHETHER THE LOGICAL START OFFSET REPRESENTS AN INTERMEDIATE POSITION OF THE START DATA CHUNK
410

BASED ON A DETERMINATION THAT THE LOGICAL START OFFSET REPRESENTS AN INTERMEDIATE POSITION OF THE START DATA CHUNK, APPEND, TO A DESTINATION MANIFEST, A START PARTIAL CHUNK ENTRY REPRESENTING A SUB-RANGE OF THE START DATA CHUNK
412

GENERATE, BASED ON THE DESTINATION MANIFEST WITH THE APPENDED START PARTIAL CHUNK ENTRY, A BACKUP OF THE LOGICAL RANGE OF THE SOURCE BACKUP
414

REGION CLONING FOR DEDUPLICATION

BACKGROUND

Data may be stored using a variety of techniques. In some cases, multiple copies of data may be stored to generate duplicates of the data. In this regard, deduplication may be described as a process of eliminating redundant information from the copies of the data.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Region cloning apparatuses, methods for region cloning, and non-transitory computer readable media having stored thereon machine readable instructions to provide region cloning are disclosed herein. The apparatuses, methods, and non-transitory computer readable media disclosed herein provide for preservation of deduplication ratios and performance for boundary data chunks, for example, when cloning variably chunked regions. In this regard, a variably chunked region may be a part of a deduplicated stream of data, where that part is to be cloned. Further, a clone operation may be an operation to make a copy of a specified part of such a deduplicated stream of data.

With respect to deduplication of data, a deduplication system may divide a backup data stream into smaller data units called "chunks". For example, a fixed or variable length chunking technique may be implemented to determine data chunk boundaries. A fingerprint of a data chunk (e.g., a hash of the data chunk, or another suitable content-defined representation of the data chunk derived via, for example, performing a function on the data chunk) may be obtained for each data chunk, and certain data chunks (e.g., non-duplicate data chunks) may be stored in collections called "containers". When a data stream that is to be backed-up is received, the deduplication system may derive fingerprints of data chunks that make up the data stream, and compare the fingerprints of the incoming data chunks with fingerprints of data chunks previously stored in the containers. For example, the respective fingerprints of a given sequence of incoming data chunks may be compared against the fingerprints of data chunks stored in a given one of the containers, or the like. When a fingerprint of an incoming data chunk is determined to match a fingerprint of a data chunk previously stored in a container, storing the incoming data chunk in a container may be avoided, since an equivalent data chunk was previously stored in a container.

The deduplication system may use a manifest to represent the incoming data stream in a deduplicated form. A manifest may be a sequence of entries, with each entry representing a data chunk of the original incoming data stream, according to the order of the chunks in the incoming data stream, and where each of the represented data chunks is stored in one of the containers. In some examples, each entry may include pointer information for the data chunk (e.g., an identifier (ID) assigned to the container including the data chunk, and an offset indicating a location at which the data chunk is stored within the container), and a fingerprint of the data chunk. In such examples, a data stream, once deduplicated, may be referred to as a "backup" and may be represented by one or more manifests.

In some cases, instead of sending a full data stream for a backup to the deduplication system, a backup may be created (at least in part) by splicing together components of previous backup(s). One such example may include a full backup of a dataset, followed by many days of incremental backups that include the changed regions of data from the original backup. In this regard, a synthetic full backup may be created by using clone requests that use the manifest(s) of previous backup(s) as source(s) for the clone requests and may use manifests(s) of the synthetic full backup as target(s) (e.g., destination(s)) of the clone requests. For example, a clone request may request that a given part of a previously-created manifest be copied to make up part of a synthetic full backup. In such examples, the part of a manifest to be copied may be specified by source front (e.g., start) and back (e.g., end) offsets for the manifest. As the deduplication process may already include the deduplicated data at the source of these clone requests, much of the deduplication process (e.g., chunking and matching) may not be needed.

In some cases, the clone request source front and back offsets may not align with the variable chunk boundaries of the stream represented by the source manifest (and thus may not align with the entries of the source manifest), as these data chunk boundaries may be unrelated to the way the data has changed, and as such, the content of later, incremental backups. This may result in the boundaries of the clone request splitting an existing data chunk, such that a target backup is to store a sub-range of a pre-existing data chunk. As duplicate data chunks are detected by fingerprint comparison, splitting a chunk for this process may involve obtaining a fingerprint of the sub-range by loading the full data chunk (e.g., from its container), and obtaining a fingerprint of the associated sub-range to generate a new hash for the target backup manifest. In such examples, such a partitioned data chunk may become a new data chunk due to having a different fingerprint, and may then be matched against fingerprints of other existing data chunks. The partitioned data chunk may not match any other data chunk, and thus may be stored as a new data chunk, as its boundaries are partially dictated by the variable chunking technique and by the boundaries of a clone operation, which may reduce the deduplication ratio of the system.

Figure 1:
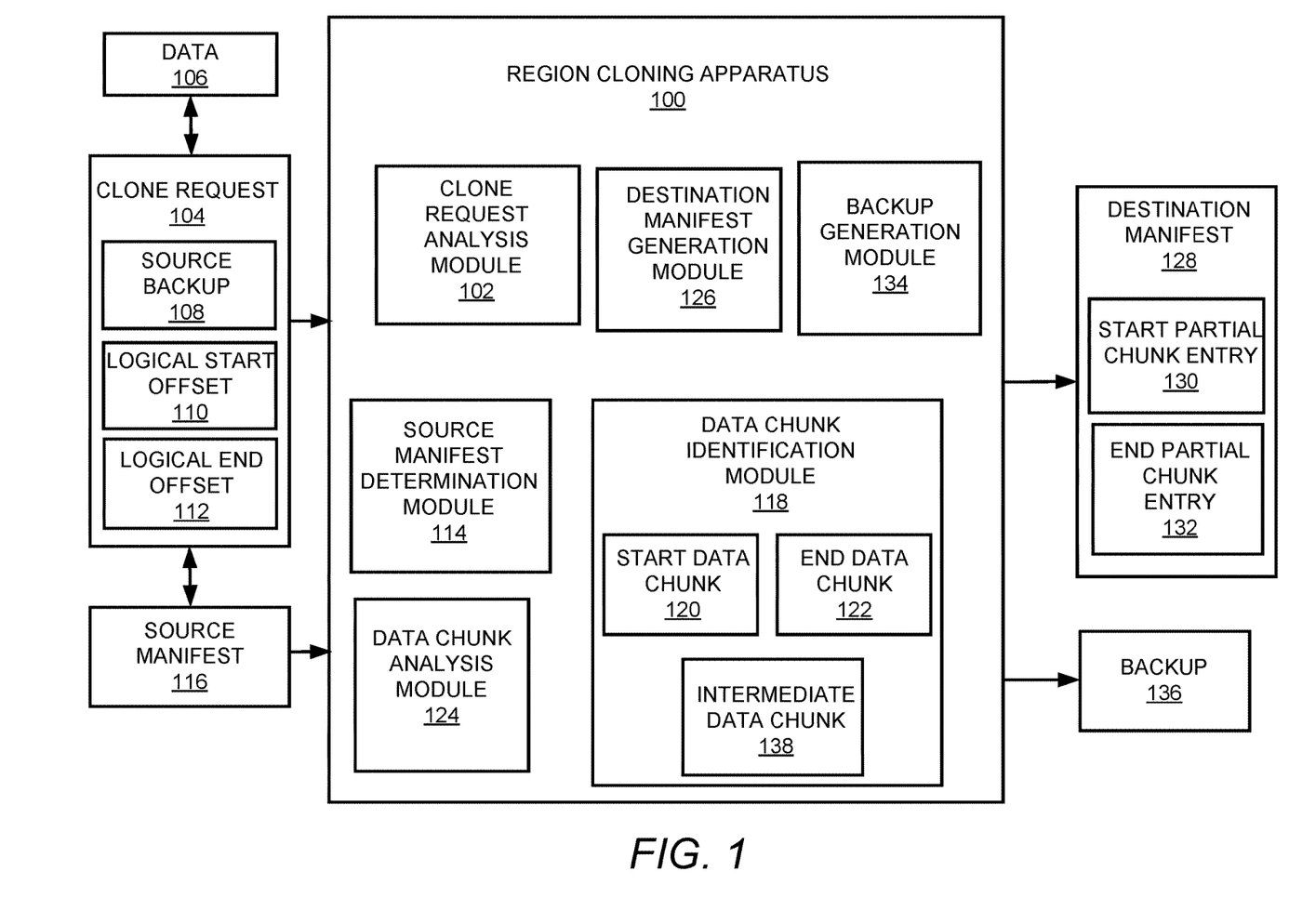
FIG. 1 illustrates a layout of a region cloning apparatus in accordance with an example of the present disclosure.
Figure 2:
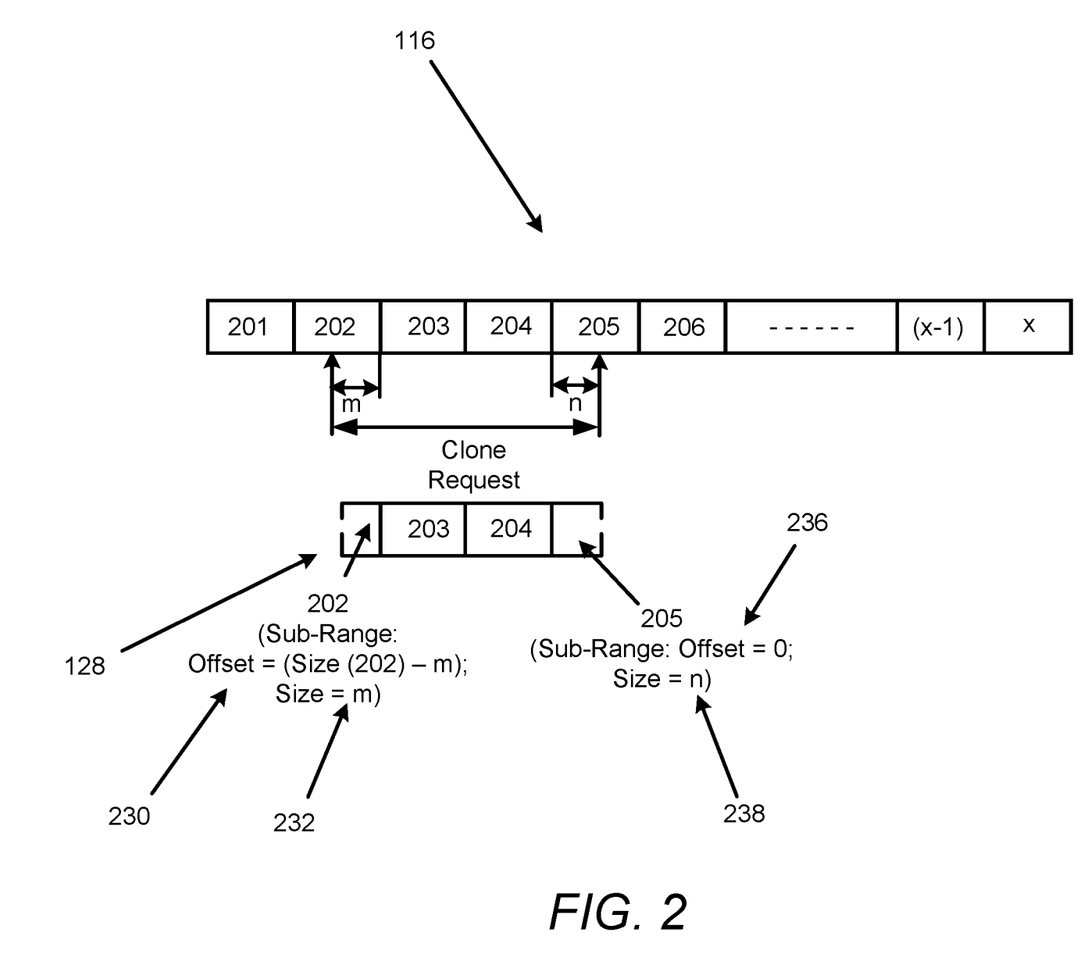
FIG. 2 illustrates a plurality of entries in a manifest of a backup to illustrate operation of the region cloning apparatus of FIG. 1 in accordance with an example of the present disclosure.

For example, FIG. 2 illustrates a plurality of entries in a manifest of a backup, to illustrate operation of the region cloning apparatus of FIG. 1 in accordance with an example of the present disclosure.

Referring to FIG. 2, for an example of a source manifest 116 for a backup of a previously received data stream, each of entries 201, 202, etc., may represent a data chunk of the backed up data stream (in the order of the chunks as they were in the original data stream), and may include pointer information for the data chunk (e.g., an identification (ID) assigned to the container including the data chunk, and an offset indicating a location at which the data chunk is stored within the container), and a fingerprint of the data chunk, as described above. For a clone request that requests to clone a logical range of an existing source backup (e.g., to clone existing data into a new destination (or target) manifest as a meta data operation), the requested logical range may begin, for example, one-half of the way through the data chunk represented by entry 202 of source manifest 116, and may end, for example, one-half of the way through the data chunk represented by entry 205 of source manifest 116. In this regard, a sequence to generate a clone based on the source manifest 116 may include receiving a clone request to clone a logical range of a source backup, where the clone request may include information such as identification of the source backup, a logical start offset, and a logical end offset. In response to the request, the source manifest 116 may be loaded, and based on the logical start offset and the logical end offset, a start entry (e.g., entry 202) representing a start data chunk at the logical start offset, and an end entry (e.g., entry 205) representing an end data chunk at the logical end offset may each be identified. In the example of FIG. 2, the source manifest 116 may represent a total of X data chunks (via X entries), where X is a positive integer greater than zero. In the example of FIG. 2, neither the logical start offset nor the logical end offset coincide with chunk boundaries (and thus do not correspond to entry boundaries of the source manifest 116). In such examples, "partitioning" the start and end data chunks may lead to a performance reduction for the deduplication system, since a partitioning process may include using entries 202 and 205 to retrieve the corresponding full data chunks represented by those entries from their respective containers, trimming those data chunks to the appropriate amount to correspond to the logical start and end offsets, generating content-defined fingerprints (e.g., hashes) for the trimmed data chunks, and storing the trimmed data chunks as new data chunks in the container(s) (with corresponding indexing). Entries representing the trimmed data chunks may then be used in a destination manifest of the destination backup to represent the appropriate portions of the start and end data chunks.

However, the aforementioned deduplication techniques may result in loss of potential deduplication of data (i.e., reduction in deduplication ratio). Further, the aforementioned deduplication techniques may also increase performance cost by reading, decompressing, and (re)fingerprinting the full data of data chunks that are to be partitioned.

Examples described herein may address these issues and may help preserve deduplication ratios, and improve performance when partitioning a data chunk due to misaligned offsets, as described above. For example, when processing a clone request, a start data chunk (of a source manifest) may be identified based on a logical start offset, and a determination may be made as to whether the logical start offset represents an intermediate position (e.g., a partitioning location) of the start data chunk. Based on a determination that the logical start offset represents an intermediate position of the start data chunk, a start partial chunk entry representing a sub-range of the start data chunk may be appended to a destination manifest. Further, the backup of the logical range of the source backup may be generated based on the destination manifest with the appended start partial chunk description.

According to examples disclosed herein, the apparatuses, methods, and non-transitory computer readable media disclosed herein provide for elimination of the need to provide additional chunk storage.

According to examples disclosed herein, the apparatuses, methods, and non-transitory computer readable media disclosed herein provide an increase in operational speed associated with a deduplication process, for example by increasing operation efficiency. In this regard, no loading or saving of raw data is needed, with the aspect of a partitioned data chunk being addressed entirely in the manifest domain (e.g., the source and destination manifests).

According to examples disclosed herein, for the apparatuses, methods, and non-transitory computer readable media disclosed herein, no new data may need to be stored with respect to a partitioned chunk, and thus the deduplication ratio is not adversely impacted.

According to examples disclosed herein, for the apparatuses, methods, and non-transitory computer readable media disclosed herein, when replicating between domains of deduplication, the partitioned data chunk description may be sent across a low bandwidth link, where manifests may be copied, and thereafter, any missing intermediate data chunks may be resolved. In this regard, a source manifest may be obtained from a source deduplication domain. The source manifest may be matched on a target (e.g., destination) deduplication domain. Chunk data that is not matched may be obtained from the source deduplication domain. The target manifest may be stored on the target deduplication domain, and any not matched chunks may be stored in containers on the target deduplication domain such that target manifest may be satisfied in the target deduplication domain (e.g., target manifest entries have correct container identification where not matched chunks have been stored in target deduplication domain). Target manifest entries that did match may have container IDs set to the containers where fingerprints matched on the target deduplication domain. Partial chunk offset and length may be transferred for chunks as a chunk itself is considered equivalent in both source and target domains (although they may not be stored in the same container). Transfer of partial chunks to another deduplication domain may be unmodified in terms of a sub-range as a replication operation may not further partition chunks itself as an entire manifest may be sent (e.g., there is not a clone operation occurring which is partitioning chunks).

According to examples disclosed herein, for the apparatuses, methods, and non-transitory computer readable media disclosed herein, foundational chunk data may be utilized (if needed) for matching. In this regard, an original full intact chunk may likely already be included on a target manifest from a previous replication. Thus, if a match is implemented using the fingerprint on a partial chunk (which is of the complete chunk), a match may be obtained without the need to send any chunk data.

In examples described herein, module(s), as described herein, may be any combination of hardware and programming to implement the functionalities of the respective module(s). In some examples described herein, the combinations of hardware and programming may be implemented in a number of different ways. For example, the programming for the modules may be processor executable instructions stored on a non-transitory machine-readable storage medium and the hardware for the modules may include at least one processing resource (e.g., at least one processor, CPU, circuitry, etc.) to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of an example region cloning apparatus (hereinafter also referred to as "apparatus 100").

Referring to FIG. 1, the apparatus 100 may include a clone request analysis module 102 to obtain a clone request 104 to clone a logical range of data 106 associated with a source backup 108. The clone request 104 may specify the source backup 108, a logical start offset 110, and a logical end offset 112.

A source manifest determination module 114 may determine a source manifest 116 associated with the logical range of the source backup 108.

A data chunk identification module 118 may identify, based on the logical start offset 110, a start entry of the source manifest 116. The start entry may represent a start data chunk 120. Further, the data chunk identification module 118 may identify, based on the logical end offset 112, an end entry of the source manifest 116. The end entry may represent an end data chunk 122.

A data chunk analysis module 124 may determine whether the logical start offset 110 represents an intermediate position of the start data chunk 120. For example, the intermediate position may represent a position that partitions the start data chunk 120. Further, the data chunk analysis module 124 may determine whether the logical end offset 112 represents an intermediate position of the end data chunk 122.

A destination manifest generation module 126 may append, based on a determination that the logical start offset 110 represents an intermediate position of the start data chunk 120, to a destination manifest 128, a start partial chunk entry 130 representing a sub-range of the start data chunk 120. Further, the destination manifest generation module 126 may append, based on a determination that the logical end offset 112 represents an intermediate position of the end data chunk 122, to the destination manifest 128, an end partial chunk entry 132 representing a sub-range of the end data chunk 122.

According to examples disclosed herein, the start partial chunk entry 130 for the start data chunk 120 may include a source manifest entry for the start data chunk 120, a sub-chunk offset for the start data chunk 120, and a sub-chunk length for the start data chunk 120. For example, given a clone request {logical offset x, logical offset y} partially or entirely within manifest entry {logical offset a, logical offset b}, the sub chunk range may be specified as {x-a, y-b}, and length may be specified as (sub-range end)-(sub-range start)).

According to examples disclosed herein, the end partial chunk entry 132 for the end data chunk 122 may include a source manifest entry for the end data chunk 122, a sub-chunk offset for the end data chunk 122, and a sub-chunk length for the end data chunk 122.

A backup generation module 134 may generate, based on the destination manifest 128 with the appended start partial chunk entry 130, a backup 136 of the logical range of the source backup 108. The backup generation module 134 may generate, based on the destination manifest 128 with the appended end partial chunk entry 132, the backup 136 of the logical range of the source backup 108. Further, the backup generation module 134 (in conjunction with the data chunk identification module 118) may identify an intermediate entry of the source manifest 116 between the start entry and the end entry. The intermediate entry may represent an intermediate data chunk 138 between the start data chunk 120 and the end data chunk 122. In this regard, the backup generation module 134 may generate the backup 136 of the logical range of the source backup 108 to include the intermediate entry.

Operation of the apparatus 100 is described in further detail with reference to FIGS. 1 and 2.

Referring again to FIG. 1, the apparatus 100 provides for the addition of information to a manifest, such as the destination manifest 128. In this regard, as disclosed herein, based on a determination that the logical start offset 110 represents an intermediate position of the start data chunk 120, the destination manifest generation module 126 may append a start partial chunk entry 130 (representing a sub-range of the start data chunk 120) to a destination manifest 128. Further, based on a determination that the logical end offset 112 represents an intermediate position of the end data chunk 122, the destination manifest generation module 126 may append an end partial chunk entry 132 (representing a sub-range of the end data chunk 122) to the destination manifest 128. In such examples, each partial chunk entry in the destination manifest 128 (e.g., generated for a synthetic full backup) may refer to a corresponding full data chunk stored in a container using the original fingerprint of that full data chunk, and may include address information in the partial chunk entry to indicate a particular desired sub-range of the full data chunk (e.g., an offset for the start of the sub-range, and a size or length for the sub-range). During a restore operation based (at least in part) on the destination manifest, the deduplication process disclosed herein with respect to the apparatus 100 may determine that the indicated sub-range of the full data chunk is to be restored into the data stream being restored. In such examples, clone operations whose boundaries are not at chunk or entry boundaries may be performed without loading a full data chunk, or re-writing a portion of an existing data chunk as a new data chunk. Further, when the destination manifest is used as a source for a later clone request, the clone operation may copy the extended address information of partial chunk entries as new backup streams.

The deduplication process as disclosed herein may be applicable to single or multiple deduplication domains. For example, the deduplication process as disclosed herein may be utilized to efficiently replicate backups from one deduplication domain to another deduplication domain. With respect to another deduplication domain, a manifest, such as a source manifest containing data chunk fingerprints (e.g., hashes) for a backup stream in the source deduplication domain, may be read, and the data chunk hashes may be sent to a destination deduplication domain for matching. The response from the match may indicate the data chunks that are to be read from the source deduplication domain and sent to the destination deduplication domain in order to complete a replication.

With respect to data chunks and their entries that have been partitioned due to a clone operation boundary, a match may be performed based on the fingerprint of the full data chunk. This data chunk may match (e.g., as the original backup stream containing the non-partitioned version of the data chunk has likely been replicated to the destination deduplication domain). If the data chunk matches, the information that indicates the replicating backup stream may make a partial reference to a sub range of the matched data chunk on the target deduplication domain, and may be transferred. In this regard, the container identification may not be the same in both deduplication domains.

If the replication match fails for the partial chunk representation, the entire source chunk of the partitioned chunk may be transferred, for example, with the information needed to indicate that the destination backup stream should make a partial referral to it. In this example, the partitioned data chunk on the source of the replicating process may not need to have its fingerprint (e.g., hash) determined. Further replicates of this data chunk in following backup streams may now use the original data chunk hash to match.

Referring to FIG. 2, for the source manifest 116, the clone request analysis module 102 may obtain a clone request 104 to clone a logical range of data 106 associated with a source backup 108.

The clone request 104 may specify (i.e., identify) the source backup 108, a logical start offset 110, and a logical end offset 112.

The source manifest determination module 114 may determine a source manifest 116 associated with the logical range of the source backup 108.

The data chunk identification module 118 may identify, based on the logical start offset 110, a start entry (e.g., 202) of the source manifest 116. The start entry may represent a start data chunk 120. Further, the data chunk identification module 118 may identify, based on the logical end offset 112, an end entry (e.g., 205) of the source manifest 116. The end entry may represent an end data chunk 122.

In examples in which the start data chunk 120 (e.g., represented by entry 202) is to be partitioned, based on a determination that the logical start offset 110 represents an intermediate position of the start data chunk 120, destination manifest generation module 126 may append a start partial chunk entry 130 representing a sub-range of the start data chunk 120 represented by entry 202. As disclosed herein, the start partial chunk entry 130 for the sub-range of the start data chunk 120 may include entry 202 for the start data chunk 120 from the source manifest 116 (or otherwise include the information in entry 202), as well as a sub-chunk offset 230 (e.g., (size of 202)-m) to indicate the start of the sub-range in the start data chunk 120, and a length 232 (e.g., "m") for the sub-range.

The backup generation module 134 (in conjunction with the data chunk identification module 118) may identify one or more intermediate entries (e.g., 203 and 204) of the source manifest 116 between the start entry (e.g., 202) and the end entry (e.g., 205). The intermediate entries may represent intermediate data chunks between the start data chunk 120 (e.g., represented by entry 202) and the end data chunk 122 (e.g., represented by entry 205) in the data stream represented by the source manifest 116. In this regard, the backup generation module 134 may generate the backup 136 of the logical range of the source backup 108 to include the intermediate entries (e.g., 203 and 204).

Further, assuming that the end data chunk 122 (e.g., data chunk 205) is partitioned (e.g., partial), based on a determination that the logical end offset 112 represents an intermediate position of the end data chunk 122 (represented by entry 205), the destination manifest generation module 126 may append, to the destination manifest 128, an end partial chunk entry 132 for the sub-range (e.g., 0-$n$) of the end data chunk 122 (e.g., data chunk 205). As disclosed herein, the end partial chunk entry 132 for sub-range of the end data chunk 122 may include entry 205 for the end data chunk 122 from the source manifest 116 (or otherwise include the information in entry 205), as well as a sub-chunk offset 236 (e.g., 0) to indicate the start of the sub-range in the end data chunk 122 (e.g., an offset 0, or the beginning of the data chunk), and a length 238 (e.g., "$n$") for the sub-range.

Referring again to FIG. 1, if either or both of the start data chunk 120 and end data chunk 122 is itself a partitioned data chunk represented by a partial chunk entry (that refers to a sub-range of another full data chunk), new partial chunk entries (e.g., 130, 132) may be generated from prior partial chunk entries by, for example, using different offset(s), length(s), or a combination thereof, as appropriate. In this manner, a new partial chunk entry may be generated by copying and modifying a prior partial chunk entry, reconstituting an altered version of the prior partial chunk entry, or the like. If a resultant manifest (assuming an ancestry of cloning behavior contains adjacent references to the same origin chunk) and the sub-ranges are adjacent, then it may be favorable to merge results in a smaller manifest. For example, manifest entry-1=>205 {0-100}, manifest entry-1, origin chunk 205, subrange offset 0, length 100, manifest entry-2=>205 {100-150}, and manifest entry-3=>205 {250-500}, may be specified as manifest entry-1=>205 {0-750}. Thus, repeated partitioning of clones may continue to operate in a consistent manner. With respect to copying and modifying a prior partial chunk entry, reconstituting an altered version of the prior partial chunk entry, or the like as disclosed herein with respect to modification, if a clone partitions a chunk which is already partitioned from a source manifest, the full chunk fingerprint may be retained, and further, the sub chunk offset and length may be adjusted as needed. The resultant may be a smaller range in this case (e.g., due to partitioning). For example, assuming that an original chunk in container 201 includes a length 10, and the source manifest has a partial reference to it at offset 0 and size 5 (it was likely created by the end of a clone operation in this case), the length of the data chunk in the source manifest may therefore be specified as 5. A clone operation logical start offset may fall at offset 2 into the partial chunk in the source manifest (and clone logical end offset may fall in a chunk beyond this chunk). The destination manifest may therefore include an entry for 201 with sub-range offset 2 and length of 3. This is an example of needing the end of a source manifest partial chunk for the logical start offset of a clone operation. The equivalent for an end would result in adjusting the length rather than the offset. Alternatively, it may be possible to apply both and clone a region with the start and end entirely within a single partial chunk at which point offset and length of the original partial chunk may be adjusted for the target manifest. Subsequent clones may then further partition partitioned chunks. If a partitioned chunk in a source manifest is within the "intermediate" chunks of a clone range and therefore not repartitioned, the partitioned chunk may be placed into the destination manifest with the same sub offset and length, as it refers to the same sub region.

Figure 3:
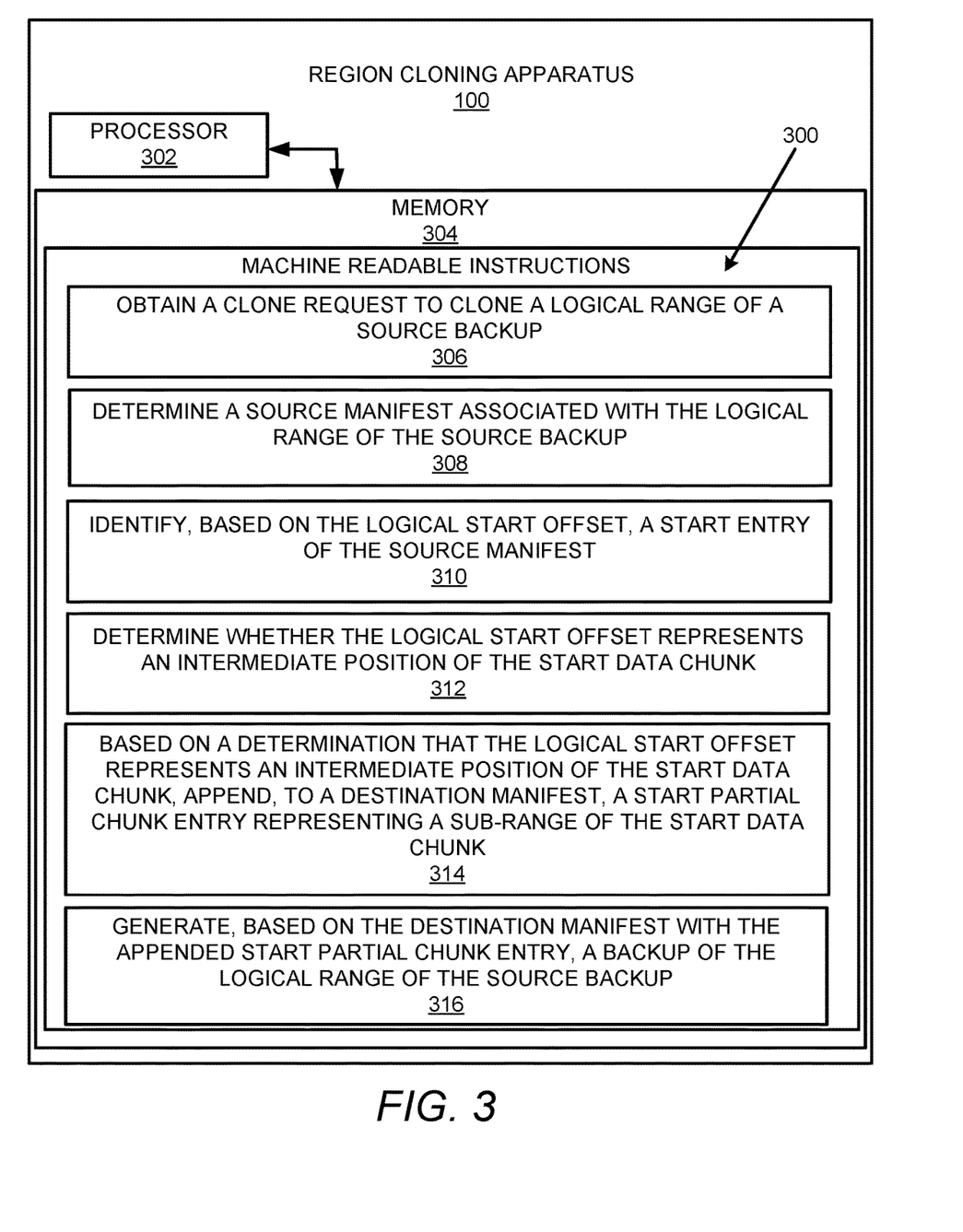
FIG. 3 illustrates an example block diagram for region cloning in accordance with an example of the present disclosure.
Figure 4:
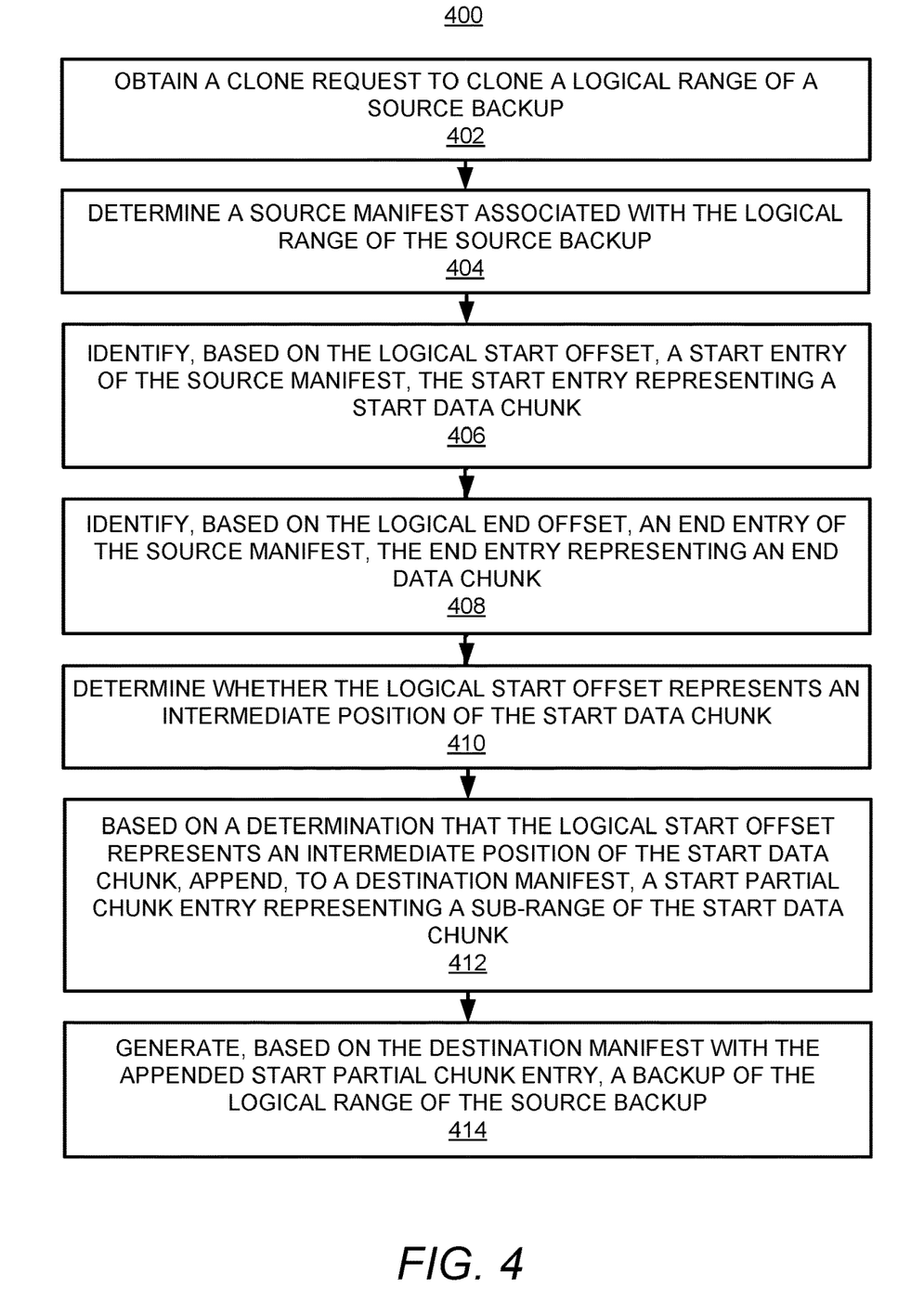
FIG. 4 illustrates a flowchart of an example method for region cloning in accordance with an example of the present disclosure.
Figure 5:
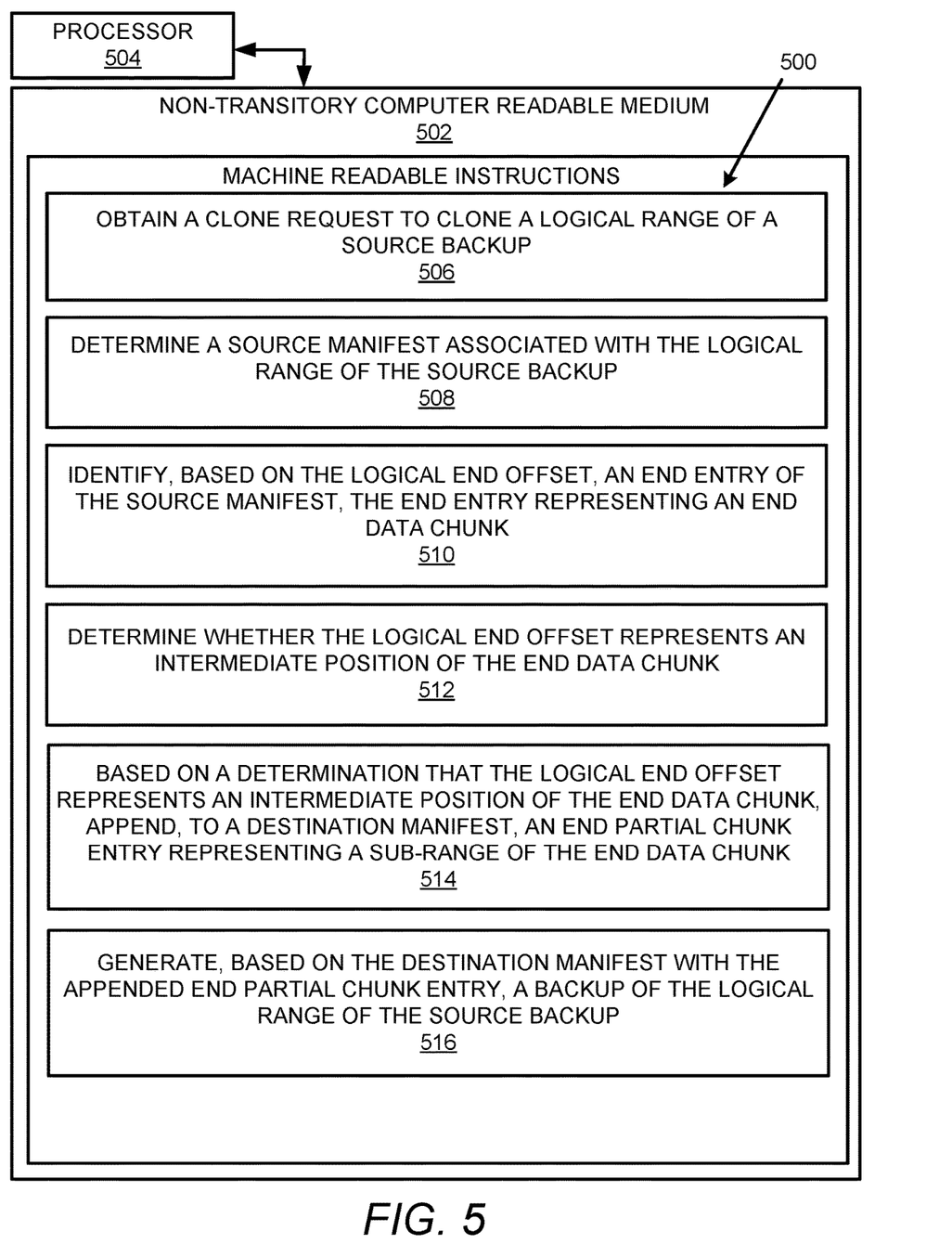
FIG. 5 illustrates a further example block diagram for region cloning in accordance with another example of the present disclosure.

FIGS. 3-5 respectively illustrate an example block diagram 300, a flowchart of an example method 400, and a further example block diagram 500 for region cloning, according to examples. The block diagram 300, the method 400, and the block diagram 500 may be implemented on the apparatus 100 described above with reference to FIG. 1 by way of example and not of limitation. The block diagram 300, the method 400, and the block diagram 500 may be practiced in other apparatus. In addition to showing the block diagram 300, FIG. 3 shows hardware of the apparatus 100 that may execute the instructions of the block diagram 300. The hardware may include a processor 302, and a memory 304 storing machine readable instructions that when executed by the processor cause the processor to perform the instructions of the block diagram 300. The memory 304 may represent a non-transitory computer readable medium. FIG. 4 may represent an example method for region cloning, and the steps of the method. FIG. 5 may represent a non-transitory computer readable medium 502 having stored thereon machine readable instructions to provide region cloning according to an example. The machine readable instructions, when executed, cause a processor 504 to perform the instructions of the block diagram 500 also shown in FIG. 5.

The processor 302 of FIG. 3 and/or the processor 504 of FIG. 5 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 502 of FIG. 5), such as hardware storage devices (e.g., RAM (random access memory), ROM (read only memory), EPROM (erasable, programmable ROM), EEPROM (electrically erasable, programmable ROM), hard drives, and flash memory). The memory 304 may include a RAM, where the machine readable instructions and data for a processor may reside during runtime.

Referring to FIGS. 1-3, and particularly to the block diagram 300 shown in FIG. 3, the memory 304 may include instructions 306 to obtain a clone request 104 to clone a logical range of a source backup 108. The clone request 104 may specify the source backup 108, a logical start offset 110, and a logical end offset 112.

The processor 302 may fetch, decode, and execute the instructions 308 to determine a source manifest 116 associated with the logical range of the source backup 108.

The processor 302 may fetch, decode, and execute the instructions 310 to identify, based on the logical start offset 110, a start entry of the source manifest 116. The start entry may represent a start data chunk 120.

The processor 302 may fetch, decode, and execute the instructions 312 to determine whether the logical start offset 110 represents an intermediate position of the start data chunk 120. For example, the intermediate position may represent a position that partitions the start data chunk 120.

The processor 302 may fetch, decode, and execute the instructions 314 to append, based on a determination that the logical start offset 110 represents an intermediate position of the start data chunk 120, to a destination manifest 128, a start partial chunk entry 130 representing a sub-range of the start data chunk 120.

The processor 302 may fetch, decode, and execute the instructions 316 to generate, based on the destination manifest 128 with the appended start partial chunk entry 130, a backup 136 of the logical range of the source backup 108.

Referring to FIGS. 1-2 and 4, and particularly FIG. 4, for the method 400, at block 402, the method may include obtaining a clone request 104 to clone a logical range of a source backup 108. The clone request 104 may specify the source backup 108, a logical start offset 110, and a logical end offset 112.

At block 404, the method may include determining a source manifest 116 associated with the logical range of the source backup 108.

At block 406, the method may include identifying, based on the logical start offset 110, a start entry of the source manifest 116. The start entry may represent a start data chunk 120.

At block 408, the method may include identifying, based on the logical end offset 112, an end entry of the source manifest 116. The end entry may represent an end data chunk 122.

At block 410, the method may include determining whether the logical start offset 110 represents an intermediate position of the start data chunk 120. For example, the intermediate position may represent a position that partitions the start data chunk 120.

At block 412, the method may include appending, based on a determination that the logical start offset 110 represents an intermediate position of the start data chunk 120, to a destination manifest 128, a start partial chunk entry 130 representing a sub-range of the start data chunk 120.

At block 414, the method may include generating, based on the destination manifest 128 with the appended start partial chunk entry 130, a backup 136 of the logical range of the source backup 108.

Referring to FIGS. 1-2 and 5, and particularly FIG. 5, for the block diagram 500, the non-transitory computer readable medium 502 may include instructions 506 to obtain a clone request 104 to clone a logical range of a source backup 108. The clone request 104 may specify the source backup 108, a logical start offset 110, and a logical end offset 112.

The processor 504 may fetch, decode, and execute the instructions 508 to determine a source manifest 116 associated with the logical range of the source backup 108.

The processor 504 may fetch, decode, and execute the instructions 510 to identify, based on the logical end offset 112, an end entry of the source manifest 116. The end entry may represent an end data chunk 122.

The processor 504 may fetch, decode, and execute the instructions 512 to determine whether the logical end offset 112 represents an intermediate position of the end data chunk 122.

The processor 504 may fetch, decode, and execute the instructions 514 to append, based on a determination that the logical end offset 112 represents an intermediate position of the end data chunk 122, to the destination manifest 128, an end partial chunk entry 132 representing a sub-range of the end data chunk 122.

The processor 504 may fetch, decode, and execute the instructions 516 to generate, based on the destination manifest 128 with the appended end partial chunk entry 132, the backup 136 of the logical range of the source backup 108.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
    at least one processor; and
    a non-transitory computer readable medium storing machine readable instructions that when executed by the at least one processor cause the at least one processor to:
        obtain a clone request to clone a logical range of a source backup, the clone request specifying the source backup, a logical start offset, and a logical end offset;
        determine a source manifest associated with the logical range of the source backup;
        identify, based on the logical start offset, a start entry of the source manifest, the start entry representing a start data chunk;
        determine whether the logical start offset represents an intermediate position of the start data chunk;
        based on a determination that the logical start offset represents an intermediate position of the start data chunk, append, to a destination manifest, a start partial chunk entry representing a sub-range of the start data chunk; and
        generate, based on the destination manifest with the appended start partial chunk entry, a backup of the logical range of the source backup.

2. The apparatus according to claim 1, wherein the start partial chunk entry for the start data chunk comprises:
    a source manifest entry for the start data chunk;
    a sub-chunk offset for the start data chunk; and
    a sub-chunk length for the start data chunk.

3. The apparatus according to claim 1, wherein the instructions are further to cause the processor to:
    identify, based on the logical end offset, an end entry of the source manifest, the end entry representing an end data chunk;
    determine whether the logical end offset represents an intermediate position of the end data chunk;
    based on a determination that the logical end offset represents an intermediate position of the end data chunk, append, to the destination manifest, an end partial chunk entry representing a sub-range of the end data chunk; and
    generate, based on the destination manifest with the appended end partial chunk entry, the backup of the logical range of the source backup.

4. The apparatus according to claim 3, wherein the end partial chunk entry for the end data chunk comprises:
    a source manifest entry for the end data chunk;
    a sub-chunk offset for the end data chunk; and
    a sub-chunk length for the end data chunk.

5. The apparatus according to claim 1, wherein the instructions are further to cause the processor to:
    identify, based on the logical end offset, an end entry of the source manifest, the end entry representing an end data chunk;
    identify an intermediate entry of the source manifest between the start entry and the end entry, the intermediate entry representing an intermediate data chunk between the start data chunk and the end data chunk; and
    generate the backup of the logical range of the source backup to include the intermediate entry.

6. A computer implemented method comprising:
    obtaining a clone request to clone a logical range of a source backup, the clone request specifying the source backup, a logical start offset, and a logical end offset;
    determining a source manifest associated with the logical range of the source backup;
    identifying, based on the logical start offset, a start entry of the source manifest, the start entry representing a start data chunk;
    identifying, based on the logical end offset, an end entry of the source manifest, the end entry representing an end data chunk;
    determining whether the logical start offset represents an intermediate position of the start data chunk;
    based on a determination that the logical start offset represents an intermediate position of the start data chunk, appending, to a destination manifest, a start partial chunk entry representing a sub-range of the start data chunk; and
    generating, based on the destination manifest with the appended start partial chunk entry, a backup of the logical range of the source backup.

7. The method according to claim 6, wherein the start partial chunk entry for the start data chunk comprises:
    a source manifest entry for the start data chunk;
    a sub-chunk offset for the start data chunk; and
    a sub-chunk length for the start data chunk.

8. The method according to claim 6, further comprising:
    determining whether the logical end offset represents an intermediate position of the end data chunk;
    based on a determination that the logical end offset represents an intermediate position of the end data chunk, appending, to the destination manifest, an end partial chunk entry representing a sub-range of the end data chunk; and
    generating, based on the destination manifest with the appended end partial chunk entry, the backup of the logical range of the source backup.

9. The method according to claim 8, wherein the end partial chunk entry for the end data chunk comprises:
    a source manifest entry for the end data chunk;
    a sub-chunk offset for the end data chunk; and
    a sub-chunk length for the end data chunk.

10. The method according to claim 6, further comprising:
    identifying an intermediate entry of the source manifest between the start entry and the end entry, the intermediate entry representing an intermediate data chunk between the start data chunk and the end data chunk; and
    generating the backup of the logical range of the source backup to include the intermediate entry.

11. A non-transitory computer readable medium having stored thereon machine readable instructions, the machine readable instructions, when executed, cause a processor to:
    obtain a clone request to clone a logical range of a source backup, the clone request specifying the source backup, a logical start offset, and a logical end offset;
    determine a source manifest associated with the logical range of the source backup;
    identify, based on the logical end offset, an end entry of the source manifest, the end entry representing an end data chunk;
    determine whether the logical end offset represents an intermediate position of the end data chunk;
    based on a determination that the logical end offset represents an intermediate position of the end data chunk, append, to a destination manifest, an end partial chunk entry representing a sub-range of the end data chunk; and generate, based on the destination manifest with the appended end partial chunk entry, a backup of the logical range of the source backup.

12. The non-transitory computer readable medium according to claim 11, wherein the end partial chunk entry for the end data chunk comprises:
a source manifest entry for the end data chunk;
a sub-chunk offset for the end data chunk; and
a sub-chunk length for the end data chunk.

13. The non-transitory computer readable medium according to claim 11, wherein the machine readable instructions, when executed, further cause the processor to:
identify, based on the logical start offset, a start entry of the source manifest, the start entry representing a start data chunk;
determine whether the logical start offset represents an intermediate position of the start data chunk;
based on a determination that the logical start offset represents an intermediate position of the start data chunk, append, to the destination manifest, a start partial chunk entry representing a sub-range of the start data chunk; and generate, based on the destination manifest with the appended start partial chunk entry, the backup of the logical range of the source backup.

14. The non-transitory computer readable medium according to claim 13, wherein the start partial chunk entry for the start data chunk comprises:
a source manifest entry for the start data chunk;
a sub-chunk offset for the start data chunk; and
a sub-chunk length for the start data chunk.

15. The non-transitory computer readable medium according to claim 11, wherein the machine readable instructions, when executed, further cause the processor to:
identify, based on the logical start offset, a start entry of the source manifest, the start entry representing a start data chunk;
identify an intermediate entry of the source manifest between the start entry and the end entry, the intermediate entry representing an intermediate data chunk between the start data chunk and the end data chunk; and
generate the backup of the logical range of the source backup to include the intermediate entry.

* * * * *